United States Patent Office.

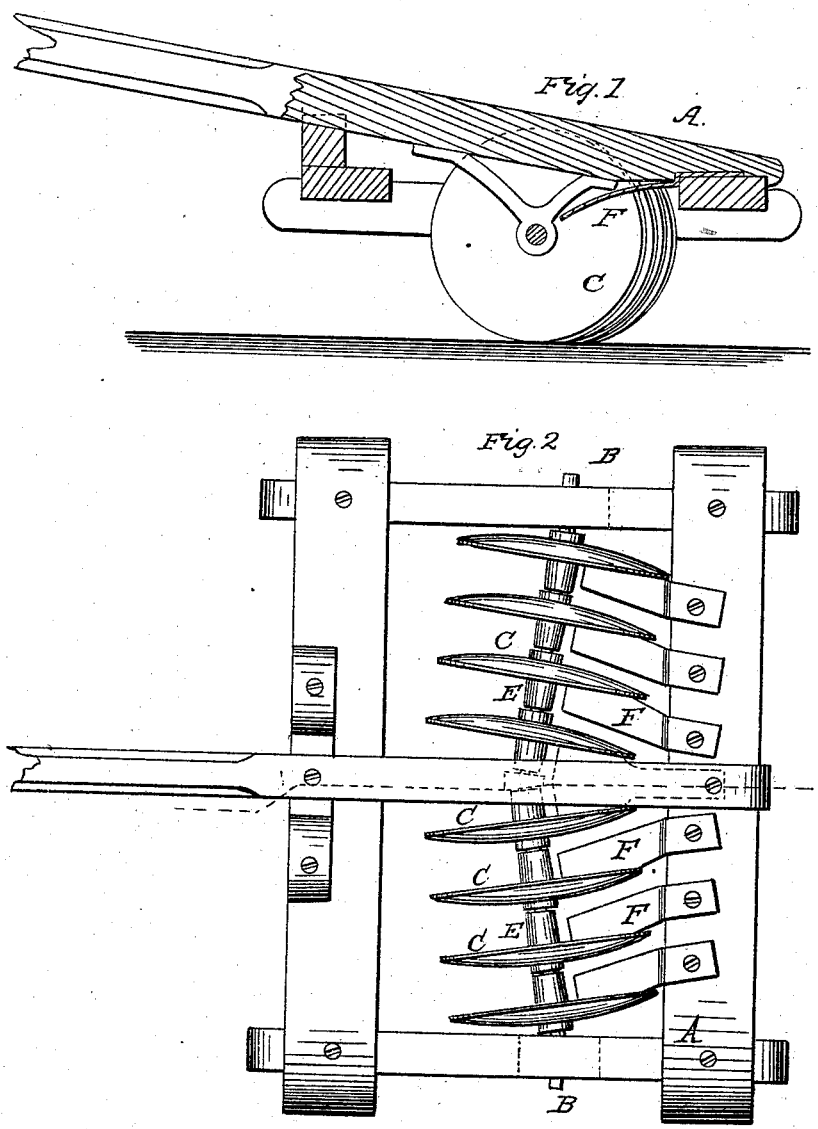

A. L. P. VAIRIN, OF RIPLEY, MISSISSIPPI.

Letters Patent No. 98,647, dated January 4, 1870.

IMPROVEMENT IN WHEELED HARROWS.

The Schedule referred to in these Letters Patent and making part of the same.

*To all whom it may concern:*

Be it known that I, A. L. P. VAIRIN, of Ripley, in the county of Tippah, and State of Mississippi, have invented a new and improved Wheel-Harrow; and I do hereby declare that the following is a full, clear, and exact description thereof, which will enable others skilled in the art to make and use the same, reference being had to the accompanying drawings, forming part of this specification.

This invention relates to harrows, and consists in the construction and arrangement of parts, as hereinafter specified.

Figure 1 represents a side elevation of my improved harrow, partly broken out, and Figure 2 represents a plan view of the same.

Similar letters of reference indicate corresponding parts.

I mount a shaft, B, on any suitable frame, A, provided with a tongue and a seat, the said shaft being for the reception of the revolving disks C, cast, or otherwise formed with hubs, having holes for the shaft, and of sufficient length to cause the disks to be separated as much as required.

This shaft is bent at the centre, as represented in fig. 1, so that the planes of the disks will not be parallel with the line of the draught. The said disks may be plane, or concavo-convex, as required, and being used as rollers whereon the frame is drawn along the ground, they will be pressed into it by the weight of the frame, and will cut and turn it up, more or less, according to the inclination from the line of draught, and the measure of their dip or dishing shape.

Scrapers F are arranged near the faces of the disks, by which the latter turn upward at the rear, to insure the delivery of the earth.

This apparatus serves excellently for pulverizing or cutting up weeds, grass, and other matters on the surface. When used for the latter purpose, the disks should be flat and sharp, and set only a little out of the line of draught; but when used for pulverizing, they should have a greater inclination, and should also be dished. The more dish, and the greater inclination the disks have, the greater will be the power required to propel the machine, but the pulverizing effect will be increased in the same measure.

The shaft may be made in two parts, and arranged so as to be adjusted to vary the inclination; and they may also be arranged so that the disks may be readily removed for the substitution of others.

The shafts may extend outward, beyond the frame, for the application of truck-wheels of larger diameter than the disks, for transporting the harrow.

Having thus described my invention,

I claim as new, and desire to secure by Letters Patent—

In combination with the frame A, the disks B, arranged to rotate on the axle B, bent at its centre, all constructed as shown and described.

A. L. P. VAIRIN.

Witnesses:
JOHN D. PALMER,
W. C. FALKNER.